US010021095B1

(12) United States Patent
Depersin et al.

(10) Patent No.: US 10,021,095 B1
(45) Date of Patent: Jul. 10, 2018

(54) SYSTEM, METHOD, AND COMPUTER PROGRAM FOR TWO LAYER USER AUTHENTICATION ASSOCIATED WITH CONNECTED HOME DEVICES

(71) Applicant: Amdocs Development Limited, Limassol (CY)

(72) Inventors: Laurent Depersin, Saint Aubin d'aubigné (FR); Jérémie de Freslon de la Freslonniére, Rennes (FR); Johann L'Hour, La Chapelle des Fougeretz (FR)

(73) Assignee: Amdocs Development Limited, Limassol (CY)

( * ) Notice: Subject to any disclaimer, the term of this patent is extended or adjusted under 35 U.S.C. 154(b) by 175 days.

(21) Appl. No.: 15/167,887

(22) Filed: May 27, 2016

Related U.S. Application Data

(60) Provisional application No. 62/168,605, filed on May 29, 2015.

(51) Int. Cl.
  *G06F 7/04* (2006.01)
  *G06F 15/16* (2006.01)
  (Continued)

(52) U.S. Cl.
  CPC ...... *H04L 63/0861* (2013.01); *H04L 63/0853* (2013.01); *H04L 63/10* (2013.01); *G06F 21/31* (2013.01); *G06F 21/32* (2013.01)

(58) Field of Classification Search
  CPC . H04L 63/0861; H04L 63/10; H04L 12/2803; H04L 12/2816; H04L 29/06; G06F 7/04; G06F 15/16; G06F 17/20
  See application file for complete search history.

(56) References Cited

U.S. PATENT DOCUMENTS 5,956,487 A * 9/1999 Venkatraman ...... H04L 12/2803
                                                                 340/3.1
6,219,793 B1   4/2001 Li et al.
(Continued)

FOREIGN PATENT DOCUMENTS

CN           103107888 A    5/2013

*Primary Examiner* — Jayesh M Jhaveri
(74) *Attorney, Agent, or Firm* — Zilka-Kotab, PC

(57) ABSTRACT

A system, method, and computer program product are provided for two layer user authentication associated with connected home devices. In use, it is determined whether a user is authenticated to control at least one connected home device utilizing a user device, as a first layer of security. If it is determined the user is authenticated to control the at least one connected home device, a command for controlling the at least one connected home device is received by the user utilizing the user device. Further, it is determined whether at least one registered fingerprint is accessible by the user device. If it is determined that at least one registered fingerprint is accessible by the user device, a fingerprint identification interface is displayed on a display associated with the user device. Additionally, a fingerprint input is received from the user utilizing the fingerprint identification interface. Furthermore, the received fingerprint input is compared with the at least one registered fingerprint. Still yet, it is determined whether the user is authenticated to control the at least one connected home device based on the comparison, as a second layer of security. If it is determined that the user is authenticated to control the at least one connected home device based on the comparison, the command for controlling the at least one connected home device is executed.

8 Claims, 6 Drawing Sheets

(51) Int. Cl.
*G06F 17/30* (2006.01)
*H04L 29/06* (2006.01)
*G06F 21/32* (2013.01)
*G06F 21/31* (2013.01)

(56) References Cited

U.S. PATENT DOCUMENTS

| | | |
|---|---|---|
| 8,745,490 B2 | 6/2014 | Kim |
| 8,838,071 B1 | 9/2014 | Cronin |
| 2006/0293891 A1* | 12/2006 | Pathuel ................. G06F 21/32 704/246 |
| 2007/0140530 A1 | 6/2007 | Coogan et al. |
| 2011/0119182 A1* | 5/2011 | Smolkin ............. G06Q 20/105 705/41 |
| 2013/0129162 A1 | 5/2013 | Cheng et al. |
| 2013/0173925 A1 | 7/2013 | Yen et al. |
| 2014/0006795 A1 | 1/2014 | Han et al. |
| 2014/0013424 A1 | 1/2014 | Lv |
| 2014/0230018 A1* | 8/2014 | Anantharaman ... H04L 63/0861 726/4 |
| 2015/0161837 A1* | 6/2015 | Smith ................ G07C 9/00158 340/5.53 |
| 2015/0186636 A1* | 7/2015 | Tharappel ............... G06F 21/32 726/8 |
| 2015/0309487 A1* | 10/2015 | Lyman ............... H04L 12/2827 700/275 |

\* cited by examiner

SYSTEM, METHOD, AND COMPUTER PROGRAM FOR TWO LAYER USER AUTHENTICATION ASSOCIATED WITH CONNECTED HOME DEVICES

CLAIM OF PRIORITY

This application claims the benefit of U.S. Provisional Application No. 62/168,605, filed May 29, 2015, the entire contents of which are incorporated herein by reference.

FIELD OF THE INVENTION

The present invention relates to connected home systems and devices, and more particularly to security associated with such connected home systems and devices.

BACKGROUND

Currently, when a user logs into a connected home application utilizing a user device (e.g. a tablet computer, a mobile phone, etc.), the user may retain access to such connected home device while in the custody of the user device. This leads to a potentially vulnerable situation when the user device has been compromised, etc., as the compromised device may be utilized to access the connected home device by a user not meant to have access to such connected home device.

There is thus a need for addressing these and/or other issues associated with the prior art.

SUMMARY

A system, method, and computer program product are provided for two layer user authentication associated with connected home devices. In use, it is determined whether a user is authenticated to control at least one connected home device utilizing a user device, as a first layer of security. If it is determined the user is authenticated to control the at least one connected home device, a command for controlling the at least one connected home device is received by the user utilizing the user device. Further, it is determined whether at least one registered fingerprint is accessible by the user device. If it is determined that at least one registered fingerprint is accessible by the user device, a fingerprint identification interface is displayed on a display associated with the user device. Additionally, a fingerprint input is received from the user utilizing the fingerprint identification interface. Furthermore, the received fingerprint input is compared with the at least one registered fingerprint. Still yet, it is determined whether the user is authenticated to control the at least one connected home device based on the comparison, as a second layer of security. If it is determined that the user is authenticated to control the at least one connected home device based on the comparison, the command for controlling the at least one connected home device is executed.

DETAILED DESCRIPTION

Figure 1:
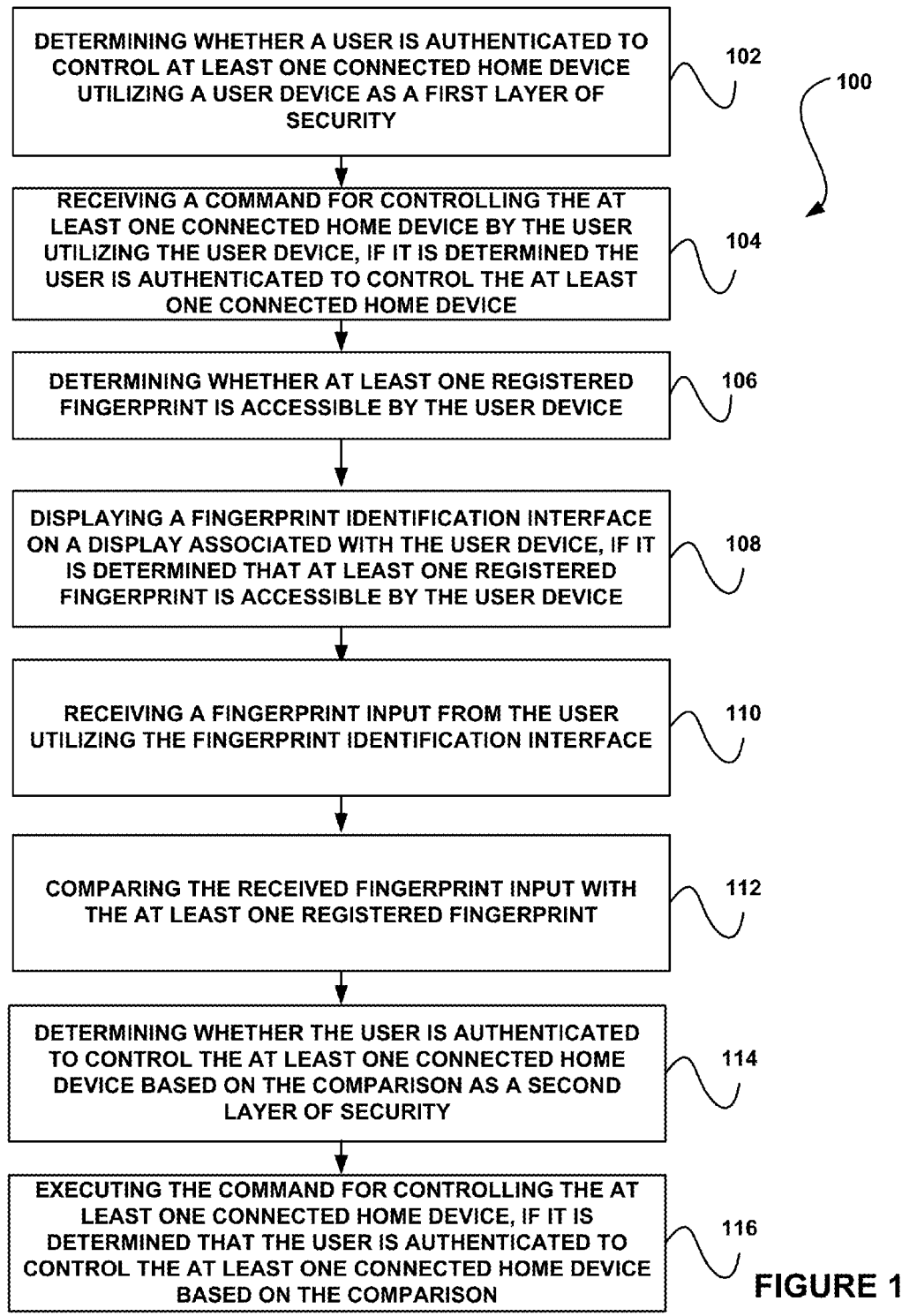
FIG. 1 illustrates a method for two layer user authentication associated with connected home devices, in accordance with one embodiment.

FIG. 1 illustrates a method 100 for two layer user authentication associated with connected home devices, in accordance with one embodiment.

As shown, it is determined, by a system, whether a user is authenticated to control at least one connected home device utilizing a user device, as a first layer of security. See operation 102. The connected home device may include any home device that is accessible communicatively via one or more networks. For example, in various embodiments, the connected home device may include an appliance, a security system, a camera, a sensor, and/or various other devices.

For the first layer of security, the user may be authenticated by virtue of being logged into an application associated with the connected home device or the user may input a password to be authenticated, etc. The user device may include any type of computing device, such as a computer, a mobile phone, and a tablet computer, etc.

The system that determines whether the user is authenticated may include a web service system (e.g. that is associated with the connected home device, etc.) or the user device itself. Thus, this initial authentication may be performed locally on the user device, remotely on the web service system, or both. The web service system may include a variety of hardware (e.g. servers, processors, databases, etc.) and software (e.g. applications, computer code, etc.).

If it is determined the user is authenticated to control the at least one connected home device, a command for controlling the at least one connected home device is received, by the user device, via input by the user utilizing the user device. See operation 104. The command may include any type of command for controlling the connected home device, such as a movement command (e.g. for a camera, etc.), an on/off command, an arm/disarm command (e.g. for a security system, etc.), and/or any other type of command.

Further, it is determined, by the system, whether at least one registered fingerprint is accessible by the user device. See operation 106. This determination may be performed locally on the user device, remotely on the web service system, or both.

If it is determined that at least one registered fingerprint is accessible by the user device, a fingerprint identification interface is displayed, by the user device, on a display associated with the user device. See operation 108. The registered fingerprint may be stored in memory of the user device and/or in an external database, etc.

Additionally, a fingerprint input is received, by the user device, from the user utilizing the fingerprint identification interface. See operation 110. In one embodiment, the fingerprint may be received utilizing an application stored locally on the user device (e.g. an existing fingerprint authorization application, a fingerprint authorization application associated with the at least one connected home device, etc.).

Furthermore, the received fingerprint input is compared with the at least one registered fingerprint by the system. See operation 112. In this case, the comparison may be performed by the user device or the web service system.

Still yet, it is determined whether the user is authenticated to control the at least one connected home device based on the comparison, as a second layer of security. See operation 114. The determination may be performed by the user device or the web service system (e.g. depending on the embodiment/implementation, etc.).

If it is determined that the user is authenticated to control the at least one connected home device based on the comparison, the command for controlling the at least one connected home device is executed by the user device. See operation 116. In various embodiments, the command may be communicated via the web service system or directly from the user device to the connected home device.

In one embodiment, the method 100 may further include determining, by the system (i.e. the user device or the web service system, etc.), whether to implement fingerprint identification. For example, it may be determined to implement the fingerprint identification for a protected operation. In this case, the protected operations may include, for example, at least one of: disarming of the at least one connected home device; bypassing a sensor associated with the at least one connected home device; executing or editing a scenario associated with the at least one connected home device; or performing an alert screen modification associated with the at least one connected home device, etc. In the context of the current description, a scenario refers to one or more rules and/or commands associated with the connected home device (e.g. as set by a user, etc.).

It should be noted that the method 100 may be implemented utilizing various systems, hardware, software, applications, user interfaces, etc., as dictated by the implementer. For example, in various embodiments, the mobile device may implement some or all of the operations of the method 100, or the web service system may implement some or all of the operations of the method 100.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
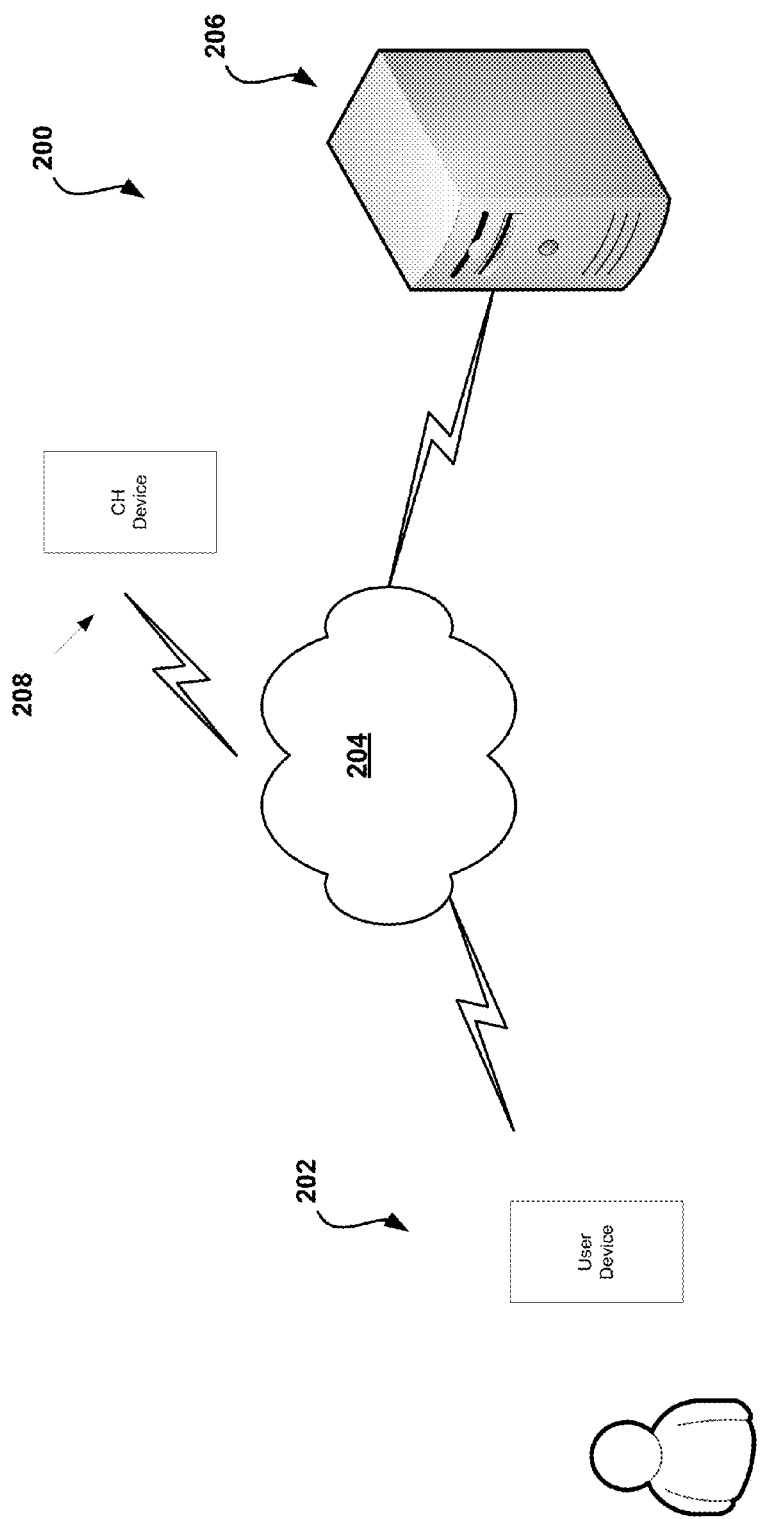
FIG. 2 illustrates a system for two layer user authentication associated with connected home devices, in accordance with one embodiment.

FIG. 2 illustrates a system 200 for two layer user authentication associated with connected home devices, in accordance with one embodiment. As an option, the system 200 may be implemented in the context of the details of FIG. 1. Of course, however, the system 200 may be implemented in the context of any desired environment. Further, the aforementioned definitions may equally apply to the description below.

As shown, one or more user devices 202 may access one or more servers 206 and one or more connected home devices 208 over one or more networks 204.

In the context of connected home security, due to the sensitivity of a particular context (e.g. an owner's house security, etc.), and to prevent the cases where the person handling a phone or tablet device running a connected home application is not the authorized owner, the system 200 may enforce an additional control, other than password authentication, for certain types of operations for which an additional level of security is desired or required.

For example, the connected home applications implemented by the user device 202 may require user name and password fields. Additionally, for some operations, where all security of the house can be compromised at the touch of a fingertip, a standard username/password entry may not be enough.

For example, in the context of a disarm function of a connected home security system where, by pressing a simple button on the user device 202, the person handling the user device (e.g. a phone), which may not be the authorized owner in the case a thief has succeeded to obtain the device, is able to disarm all the security of the house and thus commit a burglary.

To make sure the owner of the phone is the correct authorized user, a supplementary identity check may be implemented for some protected operations.

However, requiring a user to re-enter a password, etc., every time is cumbersome and time consuming. To overcome this, instead of an additional password entry, a user device's user identity check may be performed through fingerprint/touch identification. This technology is part of many mobile devices and can be leveraged to implement an additional layer of security.

In operation, an identity check of a user may be enforced for some protected operations via a text type entry of the password. In addition, for a device supporting biometric input/verification, and when the device user has already pre-registered a fingerprint to use the device (e.g. for phones featuring fingerprinting technology, etc.), a fingerprint may be used to supplement an identity check for authorized protected operation usage.

Figure 3:
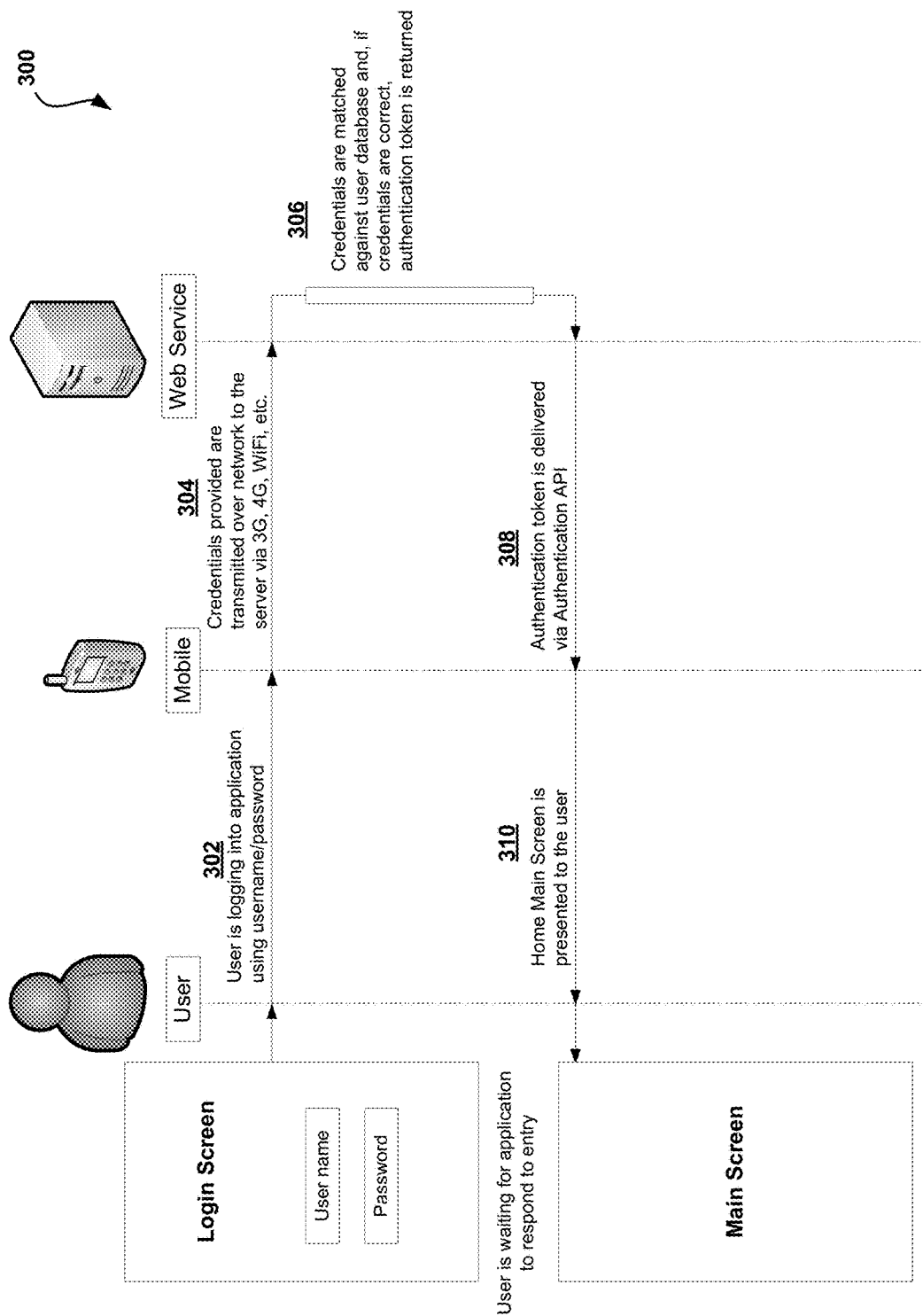
FIG. 3 illustrates a message sequence chart presenting a flow for an application login, in accordance with one embodiment.

FIG. 3 illustrates a message sequence chart 300 presenting a flow for a connected home application login, in accordance with one embodiment. As an option, the chart 300 may be implemented in the context of the details of the previous figures. Of course, however, the chart 300 may be implemented in the context of any desired environment. Further, the aforementioned definitions may equally apply to the description below.

As shown, a user logs into a connected home application by entering a username and password utilizing a mobile device. See operation 302. The credentials provided are transmitted over a network to a web service server (e.g. a 3G network, a 4G network, a WiFi network, etc.). See operation 304.

The credentials are matched against credentials in a users' database and, if the credentials are correct, an authentication token is returned to the user device. See operations 306 and 308. A user interface screen associated with the connected home device is then displayed to the user. See operation 310.

Various protected operations may require a more secure scheme with an additional identity check. Of course, any operations may be defined based on their criticality with regards to the security of the entire system. Such operations may include, for example, disarming of the entire security system, bypassing a sensor, running/disabling/deleting a scenario, and/or alert screen modification, etc.

In some cases, fingerprinting technology (e.g. Touch ID, etc.) may allow a user to sign into third-party applications such that there is no need to enter a password. In these cases, the fingerprint data is protected and is never accessed by an operating system or other applications. The applicability of this concept may be extended to enforce an additional level of identity check.

Figure 4:
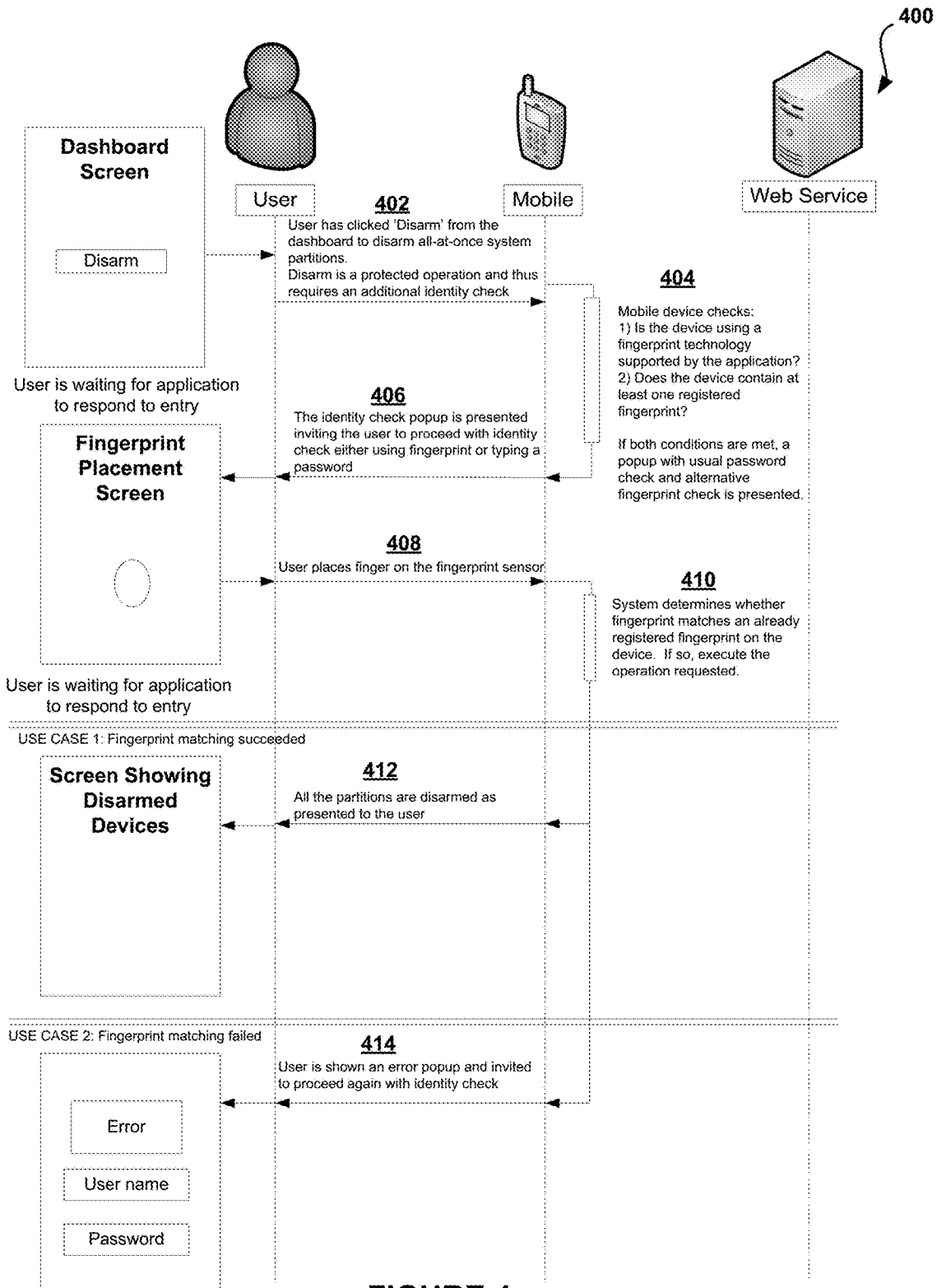
FIG. 4 illustrates a message sequence chart presenting a flow when attempting to execute a 'disarm all' feature of a connected home device, in accordance with one embodiment.

FIG. 4 illustrates a message sequence chart 400 presenting a flow when attempting to execute a 'disarm all' feature of a connected home device, in accordance with one embodiment. As an option, the chart 400 may be implemented in the context of the details of the previous figures. Of course, however, the chart 400 may be implemented in the context of any desired environment. Further, the aforementioned definitions may equally apply to the description below.

As shown, a user clicks on a 'disarm' option from a connected home dashboard presented on a user interface of a mobile device. See operation 402. In this case, the disarm function is used to disarm all-at-once system partitions. Thus, the disarm function is a protected operation and requires an additional security check.

In response, the mobile device checks to determine: 1) whether the mobile device includes fingerprint technology supported by the application associated with the connected home device; and 2) whether there is a registered fingerprint present. If both conditions are met, a popup with a standard password check and an alternative fingerprint check is presented utilizing the mobile device. See operation 404.

The identity check popup is presented and invites the user to proceed with the identity check either by using a fingerprint or by typing a password. See operation 406. The user then puts a finger on a sensor of the mobile device that reads fingerprints. See operation 408. The mobile device then determines whether the fingerprint matches a fingerprint that is already registered on the mobile device.

If there is a match, the requested operation is executed. See operations 410 and 412. If there is not a match, the requested operation is not executed and the mobile device displays a user interface indicating an error. See operations 414

Utilizing this security scheme, not only is the security of the connect home system enforced, but also the security scheme provides a fast and reliable solution to identity check without requiring the user to type a password, which can be cumbersome in the end.

The two layer authentication can also be used whenever an alarm panel expects a PIN code to perform a command. Apart from disarming one or several partitions (in this case a partition is a collection of alarm sensors that usually belong to the same room or area), an alarm panel may require a PIN code for accessing (and changing) settings. So, this offers a total of three opportunities to use the two layer authentication described herein: 1) when the user first logs into the mobile application; 2) when the user disarms one or several partitions of the alarm panel; and 3) when the user accesses the settings of the alarm panel.

Figure 5:
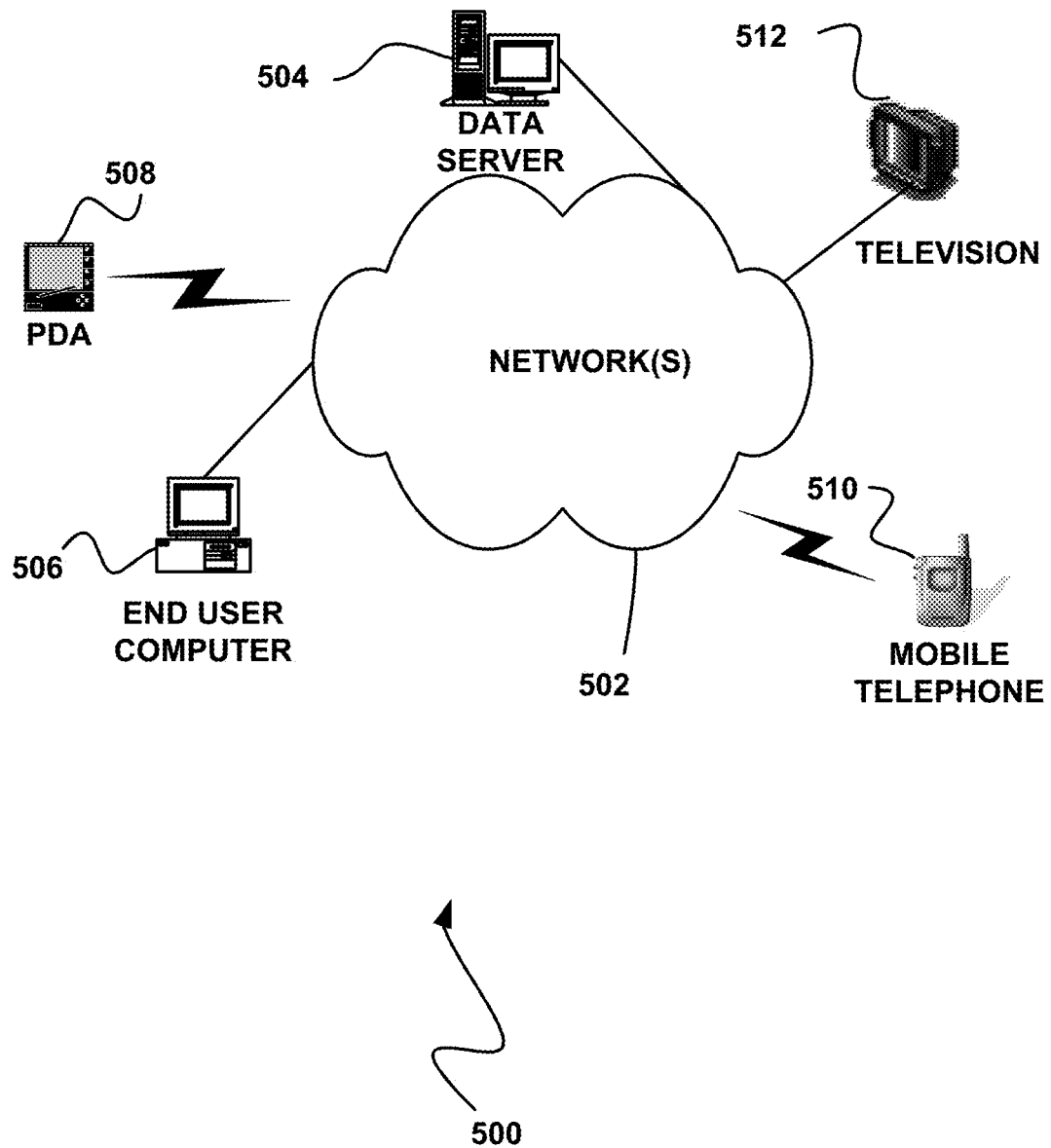
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
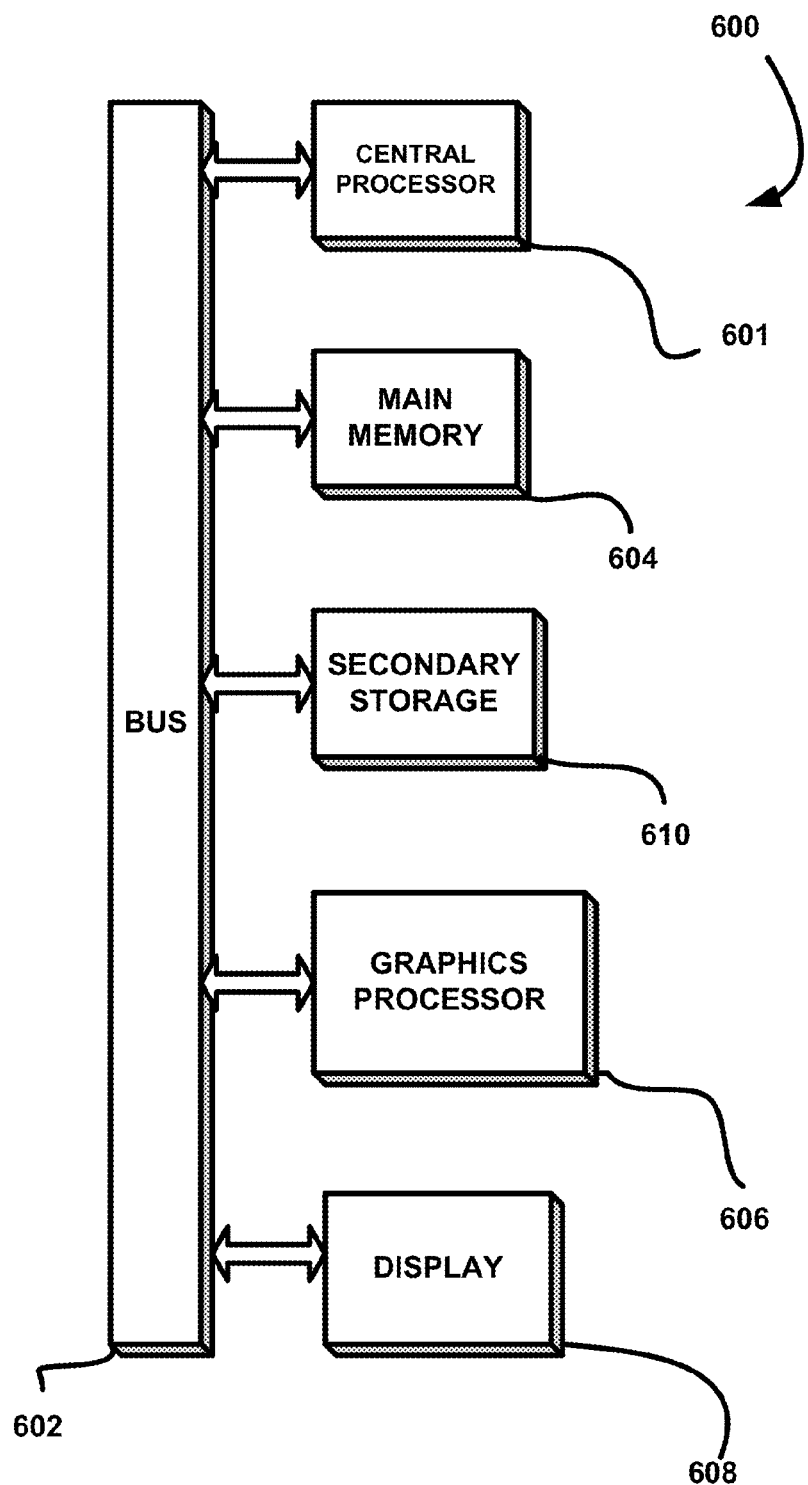
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer program product embodied on a non-transitory computer readable medium, comprising computer code for:

executing, by a user computing device, an application associated with at least one connected home device, the at least one connected home device and the user computing device being in communication over a network;

determining, by the user computing device as a first layer of security, that a user is authenticated to control the at least one connected home device utilizing the user computing device, wherein the user is authenticated by logging into the application via the user computing device;

receiving, via input entered by the user through the application executing on the user computing device, a command for controlling the at least one connected home device, when it is determined through the first layer of security that the user is authenticated to control the at least one connected home device;

in response to determining through the first layer of security that the user is authenticated, determining, by the user computing device, that the command requires a second layer of security for execution thereof;

in response to determining that the command requires the second layer of security, determining, by the user computing device, that at least one registered fingerprint is accessible;

displaying, by the user computing device, a fingerprint identification interface on a display of the user computing device, when it is determined that at least one registered fingerprint is accessible by the user computing device;

receiving, by the user computing device, a fingerprint input from the user utilizing the fingerprint identification interface;

causing, by the user computing device, the received fingerprint input to be compared with the at least one registered fingerprint;

determining, by the user computing device as the second layer of security, that the user is authenticated to control the at least one connected home device based on the comparison; and executing, by the user computing device, the command for controlling the at least one connected home device, when it is determined through the second layer of security that the user is authenticated to control the at least one connected home device.

2. The computer program product of claim 1, wherein the command that requires the second layer of security is at least one of: disarming of the at least one connected home device; bypassing a sensor associated with the at least one connected home device; executing or editing a scenario associated with the at least one connected home device; and performing an alert screen modification associated with the at least one connected home device.

3. The computer program product of claim 1, wherein the user computing device includes at least one of a tablet computer and a mobile phone.

4. A method, comprising:
   executing, by a user computing device, an application associated with at least one connected home device, the at least one connected home device and the user computing device being in communication over a network;
   determining, by the user computing device as a first layer of security, that a user is authenticated to control the at least one connected home device utilizing the user computing device, wherein the user is authenticated by logging into the application via the user computing device;
   receiving, via input entered by the user through the application executing on the user computing device, a command for controlling the at least one connected home device, when it is determined through the first layer of security that the user is authenticated to control the at least one connected home device;
   in response to determining through the first layer of security that the user is authenticated, determining, by the user computing device, that the command requires a second layer of security for execution thereof;
   in response to determining that the command requires the second layer of security, determining, by the user computing device, that at least one registered fingerprint is accessible;
   displaying, by the user computing device, a fingerprint identification interface on a display of the user computing device, when it is determined that at least one registered fingerprint is accessible by the user computing device;
   receiving, by the user computing device, a fingerprint input from the user utilizing the fingerprint identification interface;
   causing, by the user computing device, the received fingerprint input to be compared with the at least one registered fingerprint;
   determining, by the user computing device as the second layer of security, that the user is authenticated to control the at least one connected home device based on the comparison; and
   executing, by the user computing device, the command for controlling the at least one connected home device, when it is determined through the second layer of security that the user is authenticated to control the at least one connected home device.

5. The method of claim 4, wherein the command that requires the second layer of security is at least one of: disarming of the at least one connected home device; bypassing a sensor associated with the at least one connected home device; executing or editing a scenario associated with the at least one connected home device; and performing an alert screen modification associated with the at least one connected home device.

6. The method of claim 4, wherein the user computing device includes at least one of a tablet computer and a mobile phone.

7. A user computing device, comprising:
   a memory storing computer instructions; and
   at least one hardware processor in communication with the memory that executes the computer instructions to perform a method comprising:
   executing an application associated with at least one connected home device, the at least one connected home device and the user computing device being in communication over a network;
   determining, as a first layer of security, that a user is authenticated to control the at least one connected home device utilizing the user computing device, wherein the user is authenticated by logging into the application via the user computing device;
   receiving, via input entered by the user through the application executing on the user computing device, a command for controlling the at least one connected home device, when it is determined through the first layer of security that the user is authenticated to control the at least one connected home device;
   in response to determining through the first layer of security that the user is authenticated, determining that the command requires a second layer of security for execution thereof;
   in response to determining that the command requires the second layer of security, determining that at least one registered fingerprint is accessible;
   displaying a fingerprint identification interface on a display of the user computing device, when it is determined that at least one registered fingerprint is accessible by the user computing device;
   receiving a fingerprint input from the user utilizing the fingerprint identification interface;
   causing the received fingerprint input to be compared with the at least one registered fingerprint;
   determining, as the second layer of security, that the user is authenticated to control the at least one connected home device based on the comparison; and
   executing the command for controlling the at least one connected home device, when it is determined through the second layer of security that the user is authenticated to control the at least one connected home device.

8. The system of claim 7, wherein the command that requires the second layer of security is: disarming of the at least one connected home device; bypassing a sensor associated with the at least one connected home device; executing or editing a scenario associated with the at least one connected home device; and performing an alert screen modification associated with the at least one connected home device.

* * * * *